USO10025848B2

(12) United States Patent
Hirschberg et al.

(10) Patent No.: US 10,025,848 B2
(45) Date of Patent: *Jul. 17, 2018

(54) SYSTEM AND METHOD FOR PROCESSING SPEECH FILES

(71) Applicant: Nuance Communications, Inc., Burlington, MA (US)

(72) Inventors: Julia Hirschberg, Cranford, NJ (US); Stephen Whittaker, Morristown, NJ (US)

(73) Assignee: NUANCE COMMUNICATIONS, INC., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/137,781

(22) Filed: Apr. 25, 2016

(65) Prior Publication Data

US 2016/0239560 A1 Aug. 18, 2016

Related U.S. Application Data

(63) Continuation of application No. 14/089,839, filed on Nov. 26, 2013, now Pat. No. 9,369,581, which is a continuation of application No. 13/164,287, filed on Jun. 20, 2011, now Pat. No. 8,600,745, which is a continuation of application No. 12/111,533, filed on Apr. 29, 2008, now Pat. No. 7,966,181, which is a continuation of application No. 11/697,964, filed on Apr. 9, 2007, now Pat. No. 7,366,665, which is a continuation of application No. 09/879,313, filed on Jun. 12, 2001, now Pat. No. 7,225,126.

(51) Int. Cl.
G06F 17/00 (2006.01)
G10L 15/00 (2013.01)
H04M 3/00 (2006.01)
G06F 17/30 (2006.01)
H04M 3/533 (2006.01)
G10L 15/26 (2006.01)
H04L 12/58 (2006.01)

(52) U.S. Cl.
CPC .. *G06F 17/30619* (2013.01); *G06F 17/30719* (2013.01); *G10L 15/26* (2013.01); *H04L 51/08* (2013.01); *H04L 51/36* (2013.01); *H04M 3/533* (2013.01); *H04M 2201/40* (2013.01); *H04M 2203/301* (2013.01)

(58) Field of Classification Search
None
See application file for complete search history.

(56) References Cited

U.S. PATENT DOCUMENTS 3,827,079 A 7/1974 Bolick, Jr.
4,247,876 A 1/1981 Bolick, Jr.
4,410,923 A 10/1983 Patel
4,636,880 A * 1/1987 Debell ............... G11B 15/005
360/12

(Continued)

*Primary Examiner* — Fariba Sirjani

(57) ABSTRACT

A system and method for speech file processing which provides users with differentially selectable speech file transcripts which can be sent to one or more other users. The speech files may be voicemail messages from which respective voicemail transcripts are created. The voicemail transcripts are provided in a user selectable format from which users may select non-contiguous portions of the transcript.

28 Claims, 5 Drawing Sheets

(56) References Cited

U.S. PATENT DOCUMENTS

| | | | |
|---|---|---|---|
| 4,701,814 A * | 10/1987 | Westall | G11B 5/86 360/72.2 |
| 4,856,066 A | 8/1989 | Lemelson | |
| 5,153,905 A | 10/1992 | Bergeron et al. | |
| 5,199,077 A | 3/1993 | Wilcox | |
| 5,333,275 A | 7/1994 | Wheatley | |
| 5,568,540 A | 10/1996 | Greco et al. | |
| 5,649,060 A * | 7/1997 | Ellozy | G06F 17/30746 369/25.01 |
| 5,664,060 A | 9/1997 | Jarrett | |
| 5,794,249 A | 8/1998 | Orsolini | |
| 5,799,273 A | 8/1998 | Mitchell | |
| 5,937,161 A | 8/1999 | Mulligan et al. | |
| 5,946,050 A | 8/1999 | Wolff | |
| 6,094,675 A * | 7/2000 | Sunaga | G06Q 10/107 707/999.003 |
| 6,151,576 A | 11/2000 | Warnock | |
| 6,185,527 B1 | 2/2001 | Petkovic | |
| 6,199,042 B1 | 3/2001 | Kurzweil | |
| 6,219,638 B1 | 4/2001 | Padmanabhan et al. | |
| 6,243,676 B1 | 6/2001 | Witteman | |
| 6,263,308 B1 | 7/2001 | Heckerman | |
| 6,327,343 B1 | 12/2001 | Epstein et al. | |
| 6,336,093 B2 | 1/2002 | Fasciano | |
| 6,345,253 B1 * | 2/2002 | Viswanathan | G06F 17/30746 704/251 |
| 6,404,859 B1 | 6/2002 | Hasan | |
| 6,434,520 B1 | 8/2002 | Kanevsky | |
| 6,446,041 B1 | 9/2002 | Reynar et al. | |
| 6,473,778 B1 | 10/2002 | Gibbon | |
| 6,483,899 B2 | 11/2002 | Agraharam | |
| 6,507,643 B1 * | 1/2003 | Groner | H04L 51/066 379/88.14 |
| 6,526,128 B1 * | 2/2003 | Kermani | H04M 1/6505 379/88.08 |
| 6,535,848 B1 | 3/2003 | Ortega | |
| 6,611,802 B2 | 8/2003 | Lewis | |
| 6,631,368 B1 | 10/2003 | Adelman | |
| 6,651,042 B1 * | 11/2003 | Field | H04M 1/6505 379/100.05 |
| 6,687,689 B1 | 2/2004 | Fung | |
| 6,754,619 B1 | 6/2004 | Nakatsuyama | |
| 6,775,360 B2 | 8/2004 | Davidson et al. | |
| 6,775,651 B1 | 8/2004 | Lewis et al. | |
| 6,789,060 B1 | 9/2004 | Wolfe et al. | |
| 6,792,409 B2 | 9/2004 | Wutte | |
| 6,804,330 B1 | 10/2004 | Jones | |
| 6,820,055 B2 | 11/2004 | Saindon et al. | |
| 6,850,609 B1 * | 2/2005 | Schrage | H04M 3/42221 379/158 |
| 6,938,065 B2 | 8/2005 | Jain | |
| 7,050,110 B1 | 5/2006 | Lienhart | |
| 7,092,496 B1 | 8/2006 | Maes | |
| 7,177,795 B1 | 2/2007 | Chen | |
| 7,225,126 B2 | 5/2007 | Hirschberg et al. | |
| 7,366,665 B1 | 4/2008 | Hirschberg et al. | |
| 7,412,643 B1 | 8/2008 | Fischer | |
| 7,512,117 B2 * | 3/2009 | Swartz | H04L 51/066 370/352 |
| 7,558,381 B1 | 7/2009 | Ali | |
| 7,877,774 B1 | 1/2011 | Basso | |
| 7,966,181 B1 | 6/2011 | Hirschberg et al. | |
| 2001/0020954 A1 | 9/2001 | Hull | |
| 2002/0052740 A1 | 5/2002 | Charlesworth | |
| 2002/0085690 A1 | 7/2002 | Davidson | |
| 2002/0099552 A1 | 7/2002 | Rubin | |
| 2002/0103867 A1 * | 8/2002 | Schilter | G06Q 10/107 709/206 |
| 2002/0138468 A1 | 9/2002 | Kermani | |
| 2002/0188453 A1 | 12/2002 | Hirschberg et al. | |
| 2002/0188686 A1 * | 12/2002 | Mann | H04L 29/06 709/206 |
| 2003/0093794 A1 | 5/2003 | Thomas | |
| 2003/0128820 A1 | 7/2003 | Hirschberg et al. | |
| 2003/0167266 A1 | 9/2003 | Saldanha | |
| 2006/0004731 A1 * | 1/2006 | Seibel | G06F 17/30719 |
| 2006/0020673 A1 | 1/2006 | Sorge et al. | |
| 2006/0190809 A1 | 8/2006 | Hejna | |
| 2006/0271365 A1 | 11/2006 | Maes | |

* cited by examiner

*FIG. 3*

```
                "/121/19980206/m0002_0001.wrd"
        0       4300000   <pause> -709.279968
        4300000 8000000   hi -985.438416
 5      8000000 11900000  norm -862.465698
        11900000 12600000 <pause> -109.502197
        12600000 14600000 this -393.968506
        14600000 16100000 is -312.906494
        16100000 19900000 dennis -711.397949
        19900000 20000000 <pause> -23.782471
 10     20000000 24300000 picture -1002.252441
        24300000 26400000 from -434.089355
        26400000 30900000 kerry -934.740723
        30900000 33500000 i'm -617.563477
        33500000 36300000 <pause> -459.059570
 15     .
                "/121/19980206/m0002_0002.wrd"
        0       800000    <pause> -103.467438
        800000  5000000   i'll -794.972290
        5000000 7000000   <pause> -261.781982
 20     7000000 9300000   try -615.737061
        9300000 10600000  to -926.002930
        10600000 13800000 reach -748.058838
        13800000 15600000 you -281.607422
        15600000 19700000 to -926.002930
 25     19700000 26200000 describe -1454.250000
        26200000 28600000 <pause> -516.337891
        28600000 31800000 jury -849.795410
        31800000 37800000 features -1497.018066
        37800000 38200000 <pause> -820.351562
 30     38200000 43500000 separate -1221.338867
        43500000 44500000 it's -233.091797
        44500000 47500000 kerry -511.095703
        47500000 48800000 i'm -289.250000
        48800000 52100000 cable -889.345703
 35     52100000 55300000 modem -796.843750
        55300000 60900000 system -1215.606445
        60900000 67200000 <pause> -820.351562
        67200000 68300000 i -284.554688
        68300000 70100000 can -448.887695
```

FIG. 3cont.

```
70100000   71400000   be       -300.851562
71400000   75600000   reached  -878.313477
75600000   77400000   at       -326.575195
77400000   81400000   seven    -799.068359
81400000   83200000   eight    -326.339844
83200000   83300000   <pause>  -48.970703
83300000   87000000   one      -819.361328
87000000   94200000   <pause>  -846.384766

"/121/19980206/m0002_0003.wrd"
0         700000     <pause>  -64.221443
700000    2800000    two      -580.557251
2800000   6900000    five     -877.404053
6900000   11600000   nine     -860.316040
11600000  13800000   <pause>  -234.094727
13800000  17200000   nine     -729.974609
17200000  17300000   <pause>  -59.046631
17300000  21100000   one      -703.621582
21100000  22200000   <pause>  -170.018555
22200000  21500000   one      -690.791016
25100000  25200000   <pause>  -39.735352
25200000  30400000   six      -1118.569336
30400000  32900000   <pause>  -235.157227
32900000  35500000   thank    -618.897461
35500000  37600000   you      -496.676270
37600000  41100000   <pause>  -393.938477
41100000  44600000   bye      -632.617676
44600000  48400000   <pause>  -465.435547
48400000  49100000   .onhk    -286.765625
49100000  49500000   <pause>  201.351562
```

SYSTEM AND METHOD FOR PROCESSING SPEECH FILES

CROSS-REFERENCE TO RELATED APPLICATIONS

This application is a continuation of and claims priority to U.S. patent application Ser. No. 14/089,839, filed Nov. 26, 2013 by Hirschberg et al., entitled, "System and Method for Processing Speech Files", which is a continuation of and claims priority to U.S. patent application Ser. No. 13/164,287, filed Jun. 20, 2011, now U.S. Pat. No. 8,600,745, which is a continuation of and claims priority to U.S. patent application Ser. No. 12/111,533, filed Apr. 29, 2008, now U.S. Pat. No. 7,966,181, which is a continuation of and claims priority to U.S. patent application Ser. No. 11/697,964, filed Apr. 9, 2007, now U.S. Pat. No. 7,366,665, which is a continuation of and claims priority to U.S. patent application Ser. No. 09/879,313, filed Jun. 12, 2001, now U.S. Pat. No. 7,225,126. The contents of each of the foregoing is/are hereby incorporated by reference into this application as if set forth herein in full.

BACKGROUND OF THE DISCLOSURE

The present invention relates to the field of communications and more particularly to a system that allows users to select one or more portions of a speech file transcript and then provide only the selected portions to one or more entities one or more electronic formats.

Electronic mail and voicemail systems form the foundation of corporate and personal communications. Electronic mail has proven to be even more popular in recent years as the electronic mail systems have become more robust with a variety of useful features like electronic mail return receipts and the ability to attach and transfer files along with the electronic mail messages. Some current hybrid systems also have partially merged the two systems, for example, by allowing a user to check their voicemail through their electronic mail account. This is typically performed by creating an electronic mail version of a voicemail message, such as by having an electronic mail message with a digitized version of the voicemail message attached to the electronic mail message. In this case, the voicemail message may be stored and organized as with other conventional electronic mail messages.

However, none of these prior art systems, electronic mail, voicemail or any hybrid system allows users to selectively capture portions of a voicemail message and forward or send only the selected portions to one or more other users.

Accordingly, it would be desirable to have a system which allows a user to select certain portions of a speech file, such as a voicemail message, in an intuitive manner and then share such selected portions with certain designated parties the user specifies. It would be further desirable to have such an aforementioned system which allows the user to select non-contiguous portions of the speech file and then have only the non-contiguous portions provided to parties the user has specified.

SUMMARY OF THE INVENTION

The present invention is a system and method for processing speech files to allow for selection of one or more portions of the speech file for provision of only the selected portions to one or more parties. In one embodiment of the present invention, the method for processing voicemail messages includes the steps of transcribing a plurality of voicemail messages to produce a plurality of voicemail message transcripts, indexing the plurality of voicemail messages transcripts, providing the voicemail message transcripts to one or more users, receiving at least one selection action from one or more of the users, the at least one selection action identifying at least a portion of one or more of the voicemail message transcripts for delivery to one or more parties identified by the one or more users and providing the selected portion of the one or more voicemail message transcripts to the one or more parties specified by the one or more users.

The present invention includes a graphical user interface for use in browsing, searching and selecting certain portions of the speech files. The graphical user interface facilitates the user's navigation of the user's messages to enable the same person to have access to and the ability to search for information contained in their voicemails and/or electronic mail messages. The user interface may include a window or screen where the transcribed text of the voicemail messages are displayed. Certain message information such as the name of the caller, date of the call and time of the call can be displayed in a separate window or screen.

BRIEF DESCRIPTION OF THE DRAWINGS

FIG. 3 illustrates an exemplary transcript index in accordance with the teachings of the present invention.

DETAILED DESCRIPTION OF THE DRAWINGS

Figure 1:
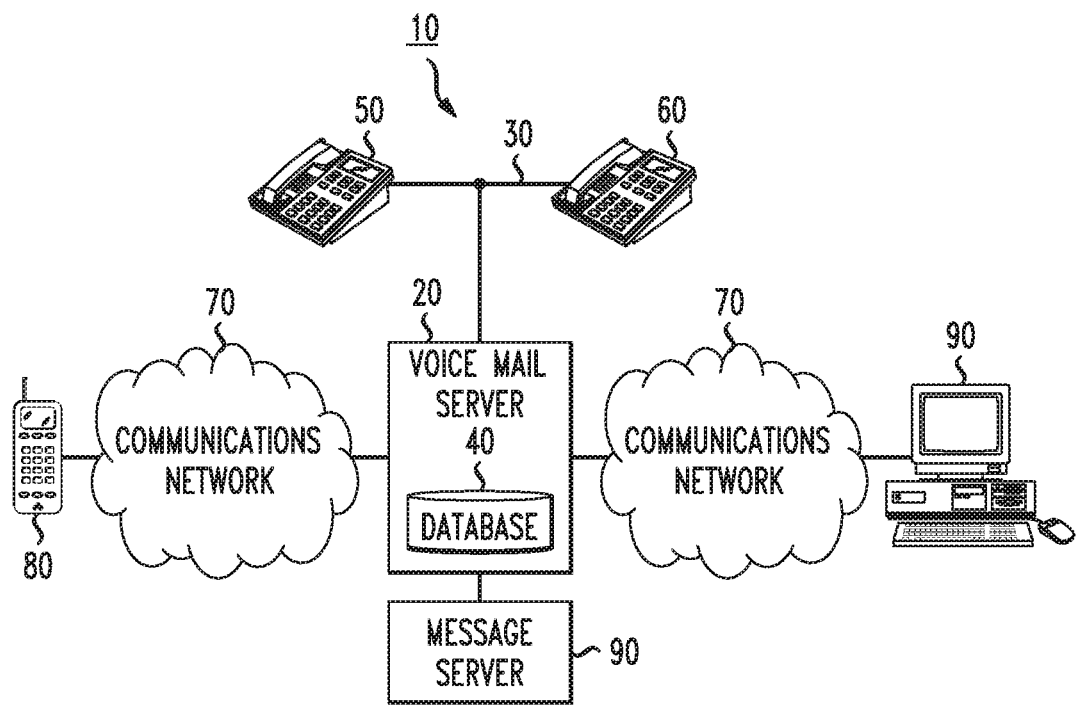
FIG. 1 illustrates a messaging system in accordance with the teachings of the present invention.

Referring to FIG. 1, a messaging system 10 is illustrated in FIG. 1 which enables users to view and select selective portions or precis of speech based information and then provide such selected information to certain parties identified by the users. In one embodiment, messaging system 10 has at least one voice mail server 20. While the preferred embodiment of the present invention is described and illustrated below as a messaging system having one voice mail server, the present invention may easily be implemented with two or more voice mail servers which may be in communication with one another. In this manner, voice mail server 20 may be connected via an inter-mailbox data network to other respective voice mail servers, not shown, in messaging system 10. Thus, each voice mail server would be able to communicate (e.g., transmit and receive information) with the other voice mail servers in the voice mailbox network system.

Referring again to FIG. 1, messaging system 10 is illustrated as having voice mail server 20 connected as part of a primary communications network 30, such as an intra company voice mail system. It is understood that primary communications network 30 could be a private branch exchange (PBX), Centrex, or similar communication or telecommunication system that controls access to the voice mail server 20. The primary communications network 30 connects subscribers, such as subscribers 50 and 60, in the network to the voice mail server 20.

In this embodiment, voice mail server 20 includes at least one database 40, for storing, for example, voice mail message files and voice mail message transcripts as discussed in more detail later herein, as well as the operating programs for the particular voice mail server served by database 40. Database 40 may be any type or combination of types of storage media such as magnetic, optical, optical-magnetic, etc. so long as the storage facility has sufficient capacity to store a plurality of voice mail messages from a plurality of subscribers.

In one embodiment, voice mail server 20 is preferably a computer system that essentially functions as a central answering machine for subscribers to the voice mail system. It is understood that the present invention can be utilized in or adapted to a variety of voice mail servers or similar equipment.

Voice mail server 20 is also connected via respective trunk lines, not shown, to a communications network 70, which is illustrated in FIG. 1 as preferably being the public switched telephone network. In this manner, a caller may access the voice mail server 20 via communications network 70 through use of a portable telephone 80 and/or personal computer 90 or other similar device. It is also understood that access to the voice mail server is not intended to be limited to telephones and/or personal computers, but could be, for instance, wireless devices, conventional facsimile machines, palmtops, or any other device that is capable of transmitting and receiving data over a telephone line.

In the present embodiment, voice mail server 20 is in communication with a message server 90, such as an electronic mail message server, for user in delivering messages, such as certain selections of voicemail transcripts and corresponding audio to one or more entities. As discussed in more detail later herein, voice mail server 20 processes speech files, in this case, the speech files are voicemail messages, to produce one or more voicemail transcripts. Users are then provided the opportunity to select one or more portions of a voicemail transcript. The one or more selected portions are provided to one or more identified recipients via message server 90.

Figure 2:
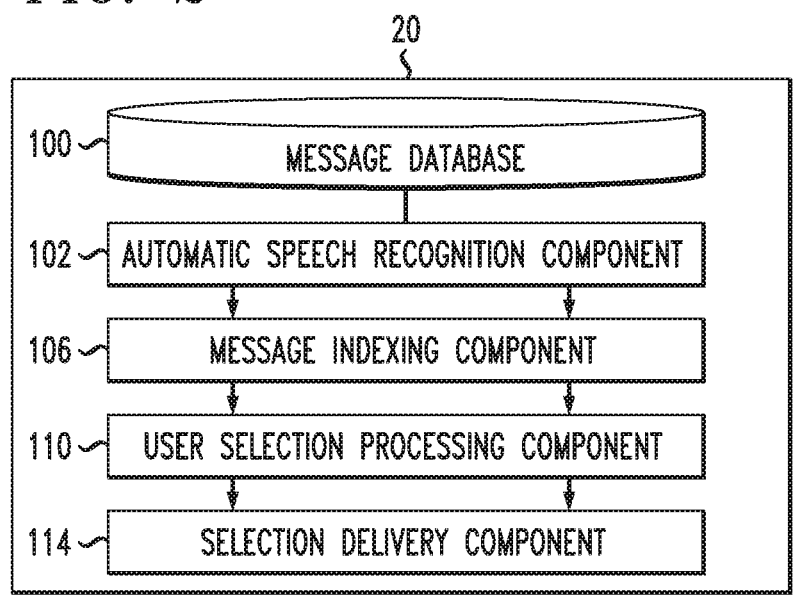
FIG. 2 illustrates an exemplary voicemail message server in accordance with the teachings of the present invention.

Referring to FIG. 2, a more detailed view of voicemail server 20 is shown. In this embodiment, voicemail server 20 includes a message database 100, an automatic speech recognition component 102, a message indexing component 106, a user selection processing component 110 and a selection delivery component 114. Typically, message database 100 receives and stores speech files, such as voicemail messages. Automatic speech recognition is performed upon these speech files by automatic speech recognition component 102 to produce transcripts of the speech files. The transcripts are then indexed by message indexing component 106 to produce a transcript index, such as shown in FIG. 3, wherein each word in the transcript is indexed relative to the occurrence of the word in the speech file. In this manner, as discussed in more detail later herein, selection of one or more words or portions of the transcripts is easily identifiable based on the indexing. User selection component 110 provides users the ability to select one or more portions of the speech transcripts. The portions selected may be non-contiguous, such as one word from one sentence, a few words from another sentence, a phone number from another section of the transcript, and other variations thereof. Once a portion or portions of a speech transcript are selected, certain desired recipients may be provided the selected portion or portions via selection delivery component 114. In one embodiment, selection delivery component 114 is an interface with a message server, such as an electronic mail message server shown in FIG. 1, which provides the selected portion or portions of a speech transcript to one or more entities as electronic mail message(s).

Figure 4:
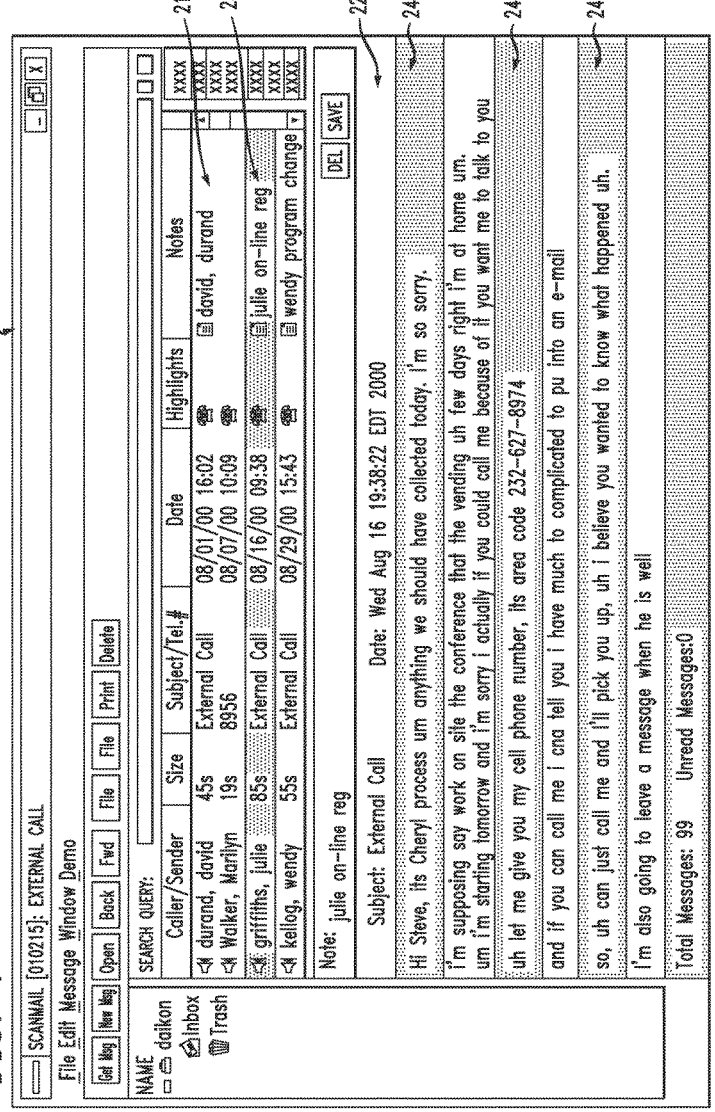
FIG. 4 illustrates an exemplary screen display in accordance with the teachings of the present invention.

Referring to FIG. 4, an exemplary user interface screen 200 as may be provided via selection delivery component 114 (FIG. 2) to one or more users is shown. Screen 200 includes a message summary section 210 and a message transcript section 220. In one embodiment, message summary section 210 provides information such as the name of the caller/sender, the size of the message, the subject/telephone number, the date and other related message information. Messages may be selected within message summary section 210, such as highlighted message 230, which provides the corresponding message transcript within message transcript section 220. From within message transcript section 220, text of the message selected within message summary section 210 is provided. A portion or portions of the transcript text may be selected within message transcript section 220, such as shown by selected non-contiguous portions 240, 244 and 248.

Figure 5:
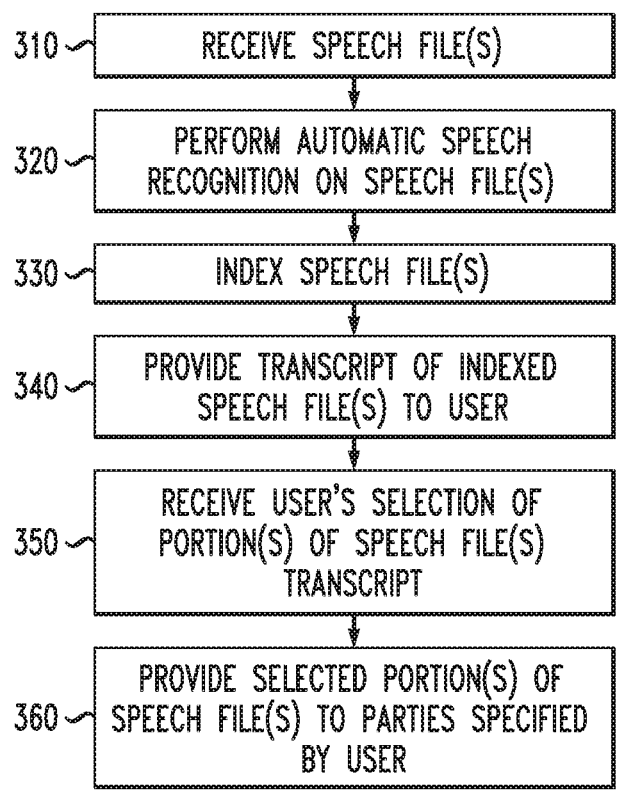
FIG. 5 illustrates an exemplary method in accordance with the teachings of the present invention.

Referring to FIG. 5, an exemplary embodiment of a method for processing speech files in accordance with the present invention is shown. In this embodiment, one or more speech file(s) are received, such as via a voicemail server discussed earlier herein, step 310. Automatic speech recognition is performed on such speech file(s), such a via an automatic speech recognition component discussed earlier herein, step 320. The speech file(s) are indexed, such as shown in FIG. 3, step 330. A transcript of the indexed speech file(s) is provided to a user, such as shown in FIG. 4, step 340. The user's selection of one or more portion(s) of the speech file(s) transcript is received, such as also shown previously in FIG. 4, step 350. The selected portion(s) of speech file transcript is provided to one or more entities or parties specified by user, step 360, such as via selection delivery component, discussed earlier herein. In one embodiment, the entities or parties may simply be electronic mail addresses or user names specified by the user to which the selected portion or portions of the transcript will be provided to. The specified recipients of the transcript portion or portions may receive the portions in both a textual and an audible format. For example, the portion or portions selected may be provided as text within an electronic mail message with an attachment of an audio file which corresponds to the selected portion or portions.

In an exemplary embodiment, automatic speech recognition or simply, speech to text techniques are used to derive text from speech, i.e. to identify the letters or words spoken by a human subject in one or more speech files, such as voicemail messages. In the present invention, automatic speech recognition is used to analyze the speech signals contained in a speech file, such as a voicemail message to produce a textual transcript of the speech signals in the voicemail message. In an exemplary embodiment, such speech recognition techniques may use a combination of pattern recognition and sophisticated guessing based on some linguistic and contextual knowledge to transcribe the speech files. It is contemplated that other methodologies and techniques may be used so long as the speech is properly transcribed into a textual format to produce a workable transcript from which a user may select one or more portions from to send or forward on to one or more other parties or entities.

In the present invention, transcribing of the voicemails by automatic speech recognition is preferably performed automatically, for example, as soon as a voicemail message is left for a user or alternatively, transcribing may be performed periodically as determined by the user or by system defaults. In one embodiment of the present invention, automatic speech recognition is performed in conjunction with or immediately subsequent to the recording of the voice or speech signals as voicemail messages. For example, transcribing may be performed as someone is leaving a voicemail message by transmitting the voice signals to the respective voicemail server for processing. Alternatively, transcribing may performed immediately after the voicemail is saved on the voicemail server by having the voicemail server first transmit the stored voicemail message to the speech recognition component of the voicemail server and then using automatic speech recognition to transcribe the voicemail.

Alternatively, the system may wait until a certain predetermined number of voicemails are stored for a certain user on the voicemail server before processing the voicemails. Once the certain predetermined number of voicemails is attained, processing of the voicemail messages may be performed on the group of voicemails by the speech recognition component. For example, the system may be configured to transcribe voicemail messages after at least two or more messages are left in a user's mailbox. As a further alternative, transcribing of the voicemails may be performed only after a user has actively selected for transcribing to be performed on the voicemails. For example, the user may be provided in the system with a menu selection or selection key which when pressed or selected, would initiate transcribing of their voicemails. The user may also be provided with the choice of having specific voicemails of their choosing processed by the system. In this instance, some users may prefer to listen to some of their voicemails in the conventional manner while having other voicemails, such as relatively longer voicemails, transcribed and indexed by the system. It is contemplated that the system may provide the user with the choice of having his/her voicemails processed by the system. In one embodiment, the user may be charged a certain fee for voicemail processing or alternatively, the voicemail processing may be offered as a free value added service.

Once the voicemails have been transcribed, the text of the voicemail message(s) may be indexed using full text indexing/retrieval techniques as known in the art. Once a user selects a portion or portions of a speech file transcript as described earlier herein, those selected portions are used in conjunction with the transcript index, such as the one shown in FIG. 3, to create a corresponding audio file containing only those selected portion to provide to the one or more parties the user has specified. In other words, the selected portions of the transcripts which the user has selected are extracted from the original speech file to produce a new speech file containing only the selected portions. It is contemplated that any number of indexing/retrieval techniques may be employed within the present invention to provide for more efficient and faster information retrieval of selected portions of the speech file transcripts.

In another embodiment of the present invention, a sound or audio file of the voicemail message is also provided to the one or more users. In one embodiment, the sound or audio file may be provided as an attachment to the electronic mail message. The sound or audio file may be provided as an MPEG-x Audio Layer-x (mpx) file such as an mp3 file, a .WAV file, a streaming audio file or other similar file format.

It will be apparent to those skilled in the art that many changes and substitutions can be made to the system and method described herein without departing from the spirit and scope of the invention as defined by the appended claims.

What is claimed is:

1. A communication device, comprising:
 a processor; and
 a memory that stores executable instructions that, when executed by the processor, facilitate performance of operations, comprising:
  receiving, from a server, information associated with a voicemail message, wherein the information includes a transcript and a transcript index that are generated from the voicemail message, and wherein each respective word in the voicemail message is indexed relative to an occurrence in time of the respective word in the voicemail message to yield the transcript index;
  displaying, at a graphical user interface, the information associated with the voicemail message;
  receiving a selection of a portion of the information via the graphical user interface, wherein the selection of the portion of the information includes selection of a portion of the transcript; and
  transmitting the portion of the information to an intended recipient, wherein the portion of the information is identified based on the transcript index.

2. The communication device of claim 1, wherein the processor comprises a plurality of processors operating in a distributed processing environment, and wherein the operations further comprise receiving a second selection of the intended recipient via the graphical user interface.

3. The communication device of claim 1, wherein the operations further comprise:
 receiving a second selection of a second portion of the transcript associated with the voicemail message via the graphical user interface, wherein the portion and the second portion are not contiguous; and
 transmitting the second selection of the second portion of the transcript to the server for delivery of the second portion of to the intended recipient.

4. The communication device of claim 1, wherein the information further comprises a name associated with the voicemail message, a message summary, a telephone number associated with the voicemail message, a date associated with the voicemail message, a size of the voicemail message, or any combination thereof.

5. The communication device of claim 1, wherein the operations further comprise:
 receiving an indication for including an audio file of the voicemail message with the portion of the information; and
 transmitting the indication for including the audio file to the server for delivery of the audio file to the intended recipient with the portion of the information.

6. The communication device of claim 5, wherein the audio file includes only a second portion of the voicemail message that corresponds to the portion of the information.

7. The communication device of claim 5, wherein the audio file is delivered to the intended recipient in a .WAV format, an mpx format, a REAL Audio format, or any combination thereof.

8. The communication device of claim 1, wherein the operations further comprise:
 receiving a second selection of a second portion of second information associated with a second voicemail message via the graphical user interface; and transmitting the second selection of the second portion of the second information to the server for delivery of the second portion of the second information to the intended recipient.

9. The communication device of claim 1, wherein the information is delivered to the intended recipient as an electronic mail message.

10. The communication device of claim 9, wherein the electronic mail message includes an attachment of an audio file of the voicemail message corresponding to the portion of the information.

11. A non-transitory machine-readable storage medium, comprising executable instructions that, when executed by a processor, facilitate performance of operations, comprising:
receiving, at a communication device, information associated with a voicemail message, wherein the information includes a transcript and a transcript index that are generated from the voicemail message, and wherein each respective word in the voicemail message is indexed relative to an occurrence in time of the respective word in the voicemail message, to yield the transcript index;
displaying, at a graphical user interface, the information associated with the voicemail message;
receiving a selection of a portion of the information via the graphical user interface, wherein the selection of the portion of the information includes selection of a portion of the transcript; and
transmitting the portion of the information to an intended recipient, wherein the portion of the information is identified based on the transcript index.

12. The non-transitory machine-readable storage medium of claim 11, wherein the processor comprises a plurality of processors operating in a distributed processing environment, and wherein the communication device is identified by a remote device.

13. The non-transitory machine-readable storage medium of claim 11, wherein the information includes a name associated with the voicemail message, a message summary, a telephone number associated with the voicemail message, a date associated with the voicemail message, a size of the voicemail message, or any combination thereof.

14. The non-transitory machine-readable storage medium of claim 11, wherein the operations further comprise receiving an audio file of the voicemail message.

15. The non-transitory machine-readable storage medium of claim 14, wherein the audio file includes only a second portion of the voicemail message that corresponds to the portion of the information.

16. The non-transitory machine-readable storage medium of claim 14, wherein the audio file is received in a .WAV format, an mpx format, a REAL Audio format, or any combination thereof.

17. The non-transitory machine-readable storage medium of claim 11, wherein the information is received as an electronic mail message.

18. The non-transitory machine-readable storage medium of claim 17, wherein the electronic mail message includes an attachment of an audio file of the voicemail message corresponding to the portion of the information.

19. A method, comprising:
receiving, via a processor and from a server, information associated with a voicemail message, wherein the information includes a transcript and a transcript index that are generated from the voicemail message, and wherein each respective word the voicemail message is indexed relative to an occurrence in time of the respective word in the voicemail message, to yield the transcript index;
displaying, at a graphical user interface, the information associated with the voicemail message;
receiving a selection of a portion of the information via the graphical user interface, wherein the selection of the portion of the information includes selection of a portion of the transcript; and
transmitting the portion of the information to an intended recipient, wherein the portion of the information is identified based on the transcript index.

20. The method of claim 19, wherein the processor comprises a plurality of processors operating in a distributed processing environment, and wherein the operations further comprise receiving a first selection of a first portion of the information via the graphical user interface.

21. The method of claim 19, further comprising:
receiving a second selection of a second portion of the transcript associated with the voicemail message via the graphical user interface, wherein the portion and the second portion are not contiguous; and
transmitting the second selection of the second portion of the transcript to the server for delivery of the second portion of to the intended recipient.

22. The method of claim 19, wherein the information further comprises a name associated with the voicemail message, a message summary, a telephone number associated with the voicemail message, a date associated with the voicemail message, a size of the voicemail message, or any combination thereof.

23. The method of claim 19, further comprising:
receiving an indication for including an audio file of the voicemail message with the portion of the information; and
transmitting the indication for including the audio file to the server for delivery of the audio file to the intended recipient with the portion of the information.

24. The method of claim 23, wherein the audio file includes only a second portion of the voicemail message that corresponds to the portion of the information.

25. The method of claim 23, wherein the audio file is delivered to the intended recipient in a .WAV format, an mpx format, a REAL Audio format, or any combination thereof.

26. The method of claim 19, further comprising:
receiving a second selection of a second portion of second information associated with a second voicemail message via the graphical user interface; and
transmitting the second selection of the second portion of the second information to the server for delivery of the second portion of the second information to the intended recipient.

27. The method of claim 19, wherein the information is delivered to the intended recipient as an electronic mail message.

28. The method of claim 27, wherein the electronic mail message includes an attachment of an audio file of the voicemail message corresponding to the portion of the information.

* * * * *